Sept. 13, 1932.  C. G. SUITS  1,877,703
OSCILLATION GENERATOR
Filed Jan. 5, 1931

Inventor:
Chauncey G. Suits,
by Charles A. Mullen
His Attorney.

Patented Sept. 13, 1932

1,877,703

UNITED STATES PATENT OFFICE

CHAUNCEY G. SUITS, OF SCHENECTADY, NEW YORK, ASSIGNOR TO GENERAL ELECTRIC COMPANY, A CORPORATION OF NEW YORK

OSCILLATION GENERATOR

Application filed January 5, 1931. Serial No. 506,552.

My invention relates to oscillation generators and it has for one of its objects to provide a novel method and means for generating oscillations.

A further object of the invention is to provide an oscillation generator of simple and rugged construction and one which is reliable in operation.

A further object of the invention is to provide an oscillation generator of novel construction which does not employ electron discharge devices such as arcs and vacuum tubes nor mechanical devices such as vibratory members and the like.

Still a further object of the invention is to provide an oscillation generator which is readily adjusted for desired operation and which reliably retains its adjustment.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawing in which Fig. 1 represents an embodiment of my invention, and Fig. 2 illustrates a characteristic of the operation thereof.

Figure 1:
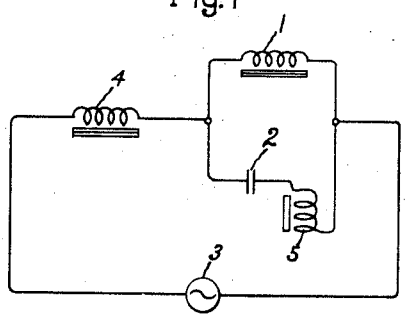
Figure 2:
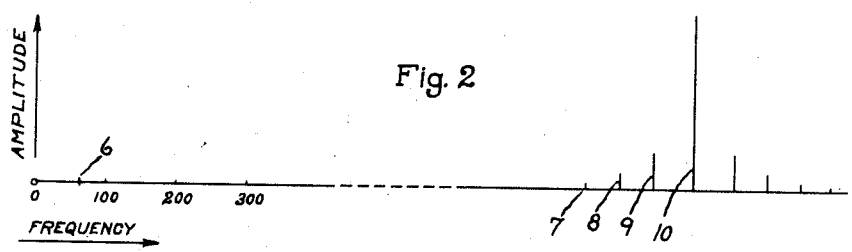

Referring to the drawing I have shown in Fig. 1 therof an oscillatory circuit comprising an inductance 1 and a condenser 2 connected across a source of alternating electromotive force 3 through an inductance 4. The oscillatory circuit 1—2 also includes any desired load device 5 whereby the oscillations generated are utilized. This load device may, for example, comprise a heating unit of an induction furnace, or a suitable coupling arrangement whereby the oscillations are transmitted to a load circuit not shown which may if desired, include any desired sound producing, or signal device. The inductance coils 1 and 4 are each provided with a core of magnetic material, such as iron, which is adapted to saturate when the current flowing through the respective winding reaches a predetermined value. Each of the cores of these inductances is arranged to saturate at a predetermined point at each half cycle of the alternating current wave produced by the generator 3, but the core of the inductance 1 saturates at a time somewhat later in the half cycle than does the core of inductance 4.

As thus described the operation of the device is as follows. During the early portion of each half cycle of the voltage wave produced by the source 3 the inductance 4 is unsaturated and accordingly this inductance is of high impedance. The condenser 2 is of relatively low impedance and accordingly practically the entire voltage of the generator 3 builds up across the inductance 4. At a predetermined time in the half cycle determined by the structure of the inductance 4 and its core the core becomes saturated thereby substantially reducing the impedance of the winding. The voltage then suddenly builds up in the nature of an abrupt voltage impulse across the condenser 2 and the inductance 1. The condenser 2 thus becomes charged but as it reaches a charge of predetermined value the core of the inductance 1 also saturates, thereby causing this inductance to become of low impedance with the result that the condenser 2 immediately discharges through the inductance 1. Because of the inductance and capacity in this circuit this discharge is in the form of a damped oscillation. As soon as the condenser 2 is discharged the inductance 1 again becomes desaturated and of high impedance.

A similar operation takes place during each half cycle of the alternating current wave thereby causing a train of damped oscillations to be excited in the oscillatory circuit 1 and 2. The trains of oscillations comprise frequencies bearing the relation to each other of fundamental and harmonics thereof. One of the harmonics has an intensity much greater than the other frequencies produced. The frequency of this harmonic corresponds to the predominant natural frequency of the oscillatory circuit, and is independent of the frequency of the source 3.

The relation between these different oscillations is illustrated in Fig. 2. In this figure the horizontal line may be taken to represent a portion of the frequency spectrum. The low frequency impressed wave, which may for example be sixty cycles, occupies a position relatively close to the left end of the line as is indicated at 6. The vertical lines, indicated at 7, 8, 9, 10, etc. represent the various high frequencies which are produced due to the phenomenon described. These frequencies are equally spaced apart in the frequency spectrum at intervals independent of the impressed frequency, and the frequency 10, which corresponds to the natural period of the oscillatory circuit, is of much greater intensity than the others. The frequency 10 can be calculated to a fair degree of approximation from the value of the capacitance 2 and the average value of the inductance of reactor 1, and may of course be varied by variation of either of these elements.

I have found that by means of the type described oscillations of high frequency and large power can be produced from a relatively low frequency source. Using a sixty cycle source I have produced oscillations having frequencies in the order of 3000 cycles.

While I have shown a particular embodiment of my invention it will of course be understood that I do not wish to be limited thereto since the embodiment described has been selected for the purpose of clearly setting forth the principles involved. It will be apparent, however, that the invention is susceptible of being modified to meet the different conditions encountered in its use and I therefore aim to cover by the appended claims all modifications falling within the true spirit and scope of my invention.

What I claim as new and desire to secure by Letters Patent of the United States is:

1. In combination, a source of alternating electromotive force, a plurality of inductance coils connected in series across said source, each of said inductance coils having a magnetic core, said cores being adapted to saturate at different times in each half cycle of the alternating current wave, and a condenser connected across the coil, the core of which is last to saturate.

2. The combination, in an oscillation generator, comprising a condenser and an inductance connected in parallel, said inductance having a magnetic core, of a source of alternating electromotive force connected across said inductance and condenser through a second inductance, said second inductance having a core adapted to saturate at a predetermined time in each half cycle of the alternating current wave thereby to cause abrupt voltage impulses to be supplied to said condenser and first inductance, the core of said first inductance being adapted to saturate in response to said impulse thereby to cause an oscillatory discharge of said condenser during each half cycle of said wave.

3. In combination, a source of alternating electromotive force, a saturable reactor, and a shunt resonant circuit all connected in series, said shunt resonant circuit having a natural frequency substantially higher than the frequency of said source, and said electromotive force having such magnitude that said saturable reactor becomes saturated during each half cycle of said electromotive force whereby an abrupt voltage impulse is supplied during each half cycle of said electromotive force to said shunt resonant circuit and oscillations are excited therein having the natural frequency of said circuit.

In witness whereof, I have hereunto set my hand this 3 day of January, 1931.

CHAUNCEY G. SUITS.